UNITED STATES PATENT OFFICE.

VILHELM GRÜNER, OF NEW YORK, N. Y., ASSIGNOR TO NORSK HYDRO-ELEKTRISK KVAELSTOFAKTIESELSKAB, OF SOLLIGATEN, CHRISTIANIA, NORWAY.

ELECTROLYSIS OF SOLUTIONS.

1,311,506.  Specification of Letters Patent.  Patented July 29, 1919.

No Drawing.   Application filed February 13, 1918. Serial No. 216,994.

*To all whom it may concern:*

Be it known that I, VILHELM GRÜNER, a subject of the King of Norway, residing at New York, New York, have invented certain new and useful Improvements in the Electrolysis of Solutions; and I do hereby declare the following to be a full, clear, and exact description of the invention, such as will enable others skilled in the art to which it appertains to make and use the same.

This invention relates to improvements in the electrolysis of solutions.

As is known great quantities of oxygen and hydrogen are at present produced by the electrolysis of water. For this purpose an alkali is added to the water, which is then electrolyzed by the use of iron electrodes. It has been found that the electrodes are very strongly and rapidly attacked when the electrolyte is not completely free from chlorids and sulfates. Similar and still more energetic attacks upon the electrodes result when solutions of nitrites are electrolyzed for the purpose of producing ammonia and an alkaline lye. It is also to be noted that in the electrolysis of nitrites the use of iron electrodes has a very undesirable influence upon the chemical reactions, injurious secondary reactions being caused to take place, which result in great losses of nitrogen, nitrogen in an elementary condition being evolved.

According to the present invention these difficulties are avoided, and the durability of the electrodes increased. The protection may be produced during the electrolytic process in question by adding to the electrolyte a soluble silicate, such as water glass or substances, which in a dissolved state behave like silicates. It has been found that even comparatively small quantities of water glass exert a very advantageous influence. This is to a high degree the case in connection with the reduction of nitrates or nitrites to ammonia. The attack upon the electrodes is hereby practically eliminated and the losses of nitrogen is reduced so that it is maintained within reasonable limits.

The following results may be mentioned by way of example.

*Electrolysis without the addition of water glass with 500 amp. per $m^2$.*

Bath tension_____ 3. volt.
Attack on the electrodes_____ several mm. in one year.
Losses of nitrogen_ up to 60%.
Current output___ below 50 per cent.

*Electrolysis with an addition of 0.5 per cent. of silica.*

Bath tension_____ 2.2 volt.
Attack on the electrodes_____ nearly unmeasurable.
Losses of nitrogen____ about 5 per cent.
Current output_____ about 90 per cent.

I claim:

1. In the electrolysis of aqueous solutions a method of protecting the anode, which consists in adding to the solution a quantity of a soluble silicate.

2. In the electrolysis of aqueous solutions a method of protecting the anode, which consists in effecting the electrolysis of the solution in the presence of a soluble silicon compound.

3. In the electrolysis of aqueous solutions the method of protecting the anode from oxidation which comprises adding to the electrolyte water glass.

In testimony that I claim the foregoing as my invention, I have signed my name in presence of two subscribing witnesses.

VILHELM GRÜNER.

Witnesses:
HARRY B. STRADLEY,
ALFRED WHARTENBY.